United States Patent [19]

Payne

[11] Patent Number: 4,752,628
[45] Date of Patent: Jun. 21, 1988

[54] CONCENTRATED LAPPING SLURRIES

[75] Inventor: Charles C. Payne, Aurora, Ill.

[73] Assignee: Nalco Chemical Company, Naperville, Ill.

[21] Appl. No.: 50,840

[22] Filed: May 15, 1987

[51] Int. Cl.$^4$ .............................................. C08K 3/22
[52] U.S. Cl. .................................... 523/122; 524/430
[58] Field of Search ........................ 523/122; 524/430

[56] References Cited

U.S. PATENT DOCUMENTS 4,260,396 4/1981 Glemza .................................. 106/5

Primary Examiner—Herbert J. Lilling
Attorney, Agent, or Firm—John G. Premo; Anthony L. Cupoli; Donald G. Epple

[57] ABSTRACT

Improved lapping compositions are disclosed which contain;

| Ingredients | % by weight | |
|---|---|---|
| | General | Preferred |
| Finely divided inorganic abrasive | 5–70 | 40–60 |
| Biocide | .05–3 | .1–2 |
| Carboxylic acid dispersant polymer | .1–1 | .2–.5 |
| Carboxylic acid polymer thickener | 0.5–5 | .2–1.5 |
| Water-soluble corrosion inhibitor | .5–5 | 1–3 |
| Lubricant (optional) | .5–3 | 1–2 |

4 Claims, No Drawings ively use in preventing the
CONCENTRATED LAPPING SLURRIES

INTRODUCTION

In the lapping of silicon wafers it is customary to utilize aqueous slurries of mild abrasives such as alumina or silicon carbide. The dilute slurries are usually prepared on site by the silicon wafer manufacturers. The on-site preparation of these diluted slurries is cumbersome, time-consuming and does not always produce high quality, uniform wafers. A particular problem resides in the use of unskilled chemical operators working with powders that tend to dust. Due to the nature of the slurries, they tend to be unstable.

If it were possible to prepare a slurry concentrate that was stable and could be used directly in a liquid form by silicon wafer manufacturers, a great advance in the art would be afforded.

THE INVENTION

In accordance with this invention, there is provided a concentrated lapping composition having the following makeup:

| Ingredients | % by weight General | Preferred |
|---|---|---|
| Finely divided inorganic abrasive | 5–70 | 40–60 |
| Biocide | .05–3 | .1–2 |
| Carboxylic acid dispersant polymer | .1–1 | .2–.5 |
| Carboxylic acid polymer thickener | 0.5–5 | .2–1.5 |
| Water-soluble corrosion inhibitor | .5–5 | 1–3 |
| Lubricant (optional) | .5–3 | 1–2 |

FINELY DIVIDED INORGANIC ABRASIVE

The finely divided inorganic abrasives used in lapping the silicon wafers are generally precision graded alumina or silicon carbide, alumina being the preferred material. Others that may be used are diamond dust, zirconium oxide, and zirconium silicate. To achieve optimum stability of alumina suspensions as well as high quality wafers, the particle size of these abrasives should be less than 20 microns and preferably less than 15 microns. A typical particle size of 15 microns will produce good cutting rates as well as high quality wafers.

BIOCIDE

The biocide may be any material capable of preventing the growth of microorganisms of the invention. Typical of such biocides would be Grotan which has the chemical composition of hexahydro-1,3,5-tris(2-hydroxyethyl)-s-triazine. Also usable is the biocide Kathon-886 which is a mixture of 75% of 5-chloro-2-methyl-4-isothiazolin-3-one and 25% 2-methyl-4-isothiazolin-3-one.

CARBOXYLIC ACID DISPERSANT POLYMER

These anionic polymers are low molecular weight materials of either acrylic acid, maleic acid, methacrylic acid and the like. They may contain up to 15% by weight of other monomers such as acrylamide.

An important characteristic of these polymers is that they be of relatively low molecular weight, e.g. 500–50,000. A preferred molecular weight range is 1,000–20,000.

A preferred dispersant polymer falling within this description is a polymaleic acid polymer in combination with a low molecular weight acrylic acid emulsion polymer. The polymaleic acid polymer is combined with the acrylic acid emulsion polymer to give an approximate weight ratio on an active polymer basis of about 1:1.

Typical of the polymaleic acid polymers are those described in U.S. Pat. No. 3,919,258, the disclosure of which is incorporated herein by reference. The acrylic acid emulsion polymers are sold commercially under the trade name Acrysol. A typical product would be Acrysol-60 which has an active concentration of polymer of about 28% and a weight average molecular weight weight of 6,000.

CARBOXYLIC ACID POLYMER THICKENER

Polymers of this type are sold under the trade name Carbopol. These polymers are cross-linked polyacrylic acids that are known to be thickeners. They are water dispersible gels. Polymers of this type are disclosed in U.S. Pat. No. 2,798,053 and U.S. Pat. No. 2,923,692, the disclosure of which is incorporated by reference.

See also, U.S. Pat. Nos. 2,340,110, 2,340,111 and 2,533,635, the disclosures of which is incorporated herein by reference.

WATER-SOLUBLE CORROSION INHIBITOR

The water-soluble corrosion inhibitor can be selected from a large number of inhibitors use in preventing the corrosion of ferrous metals. A preferred material is potassium phosphate. Other inhibitors that also may be used are the alkanolamines such as triethanolamine, sodium phosphate, molecularly dehydrated phosphates, the organic phosphonates, water-soluble nitrites, and the water-soluble silicates. LUBRICANT This optional ingredient would be selected from the water-soluble glycols such as glycerine, propylene glycol, polyoxyethylene or polyoxypropylene glycols. Such compounds are sold under the trade names Ucon, Carbowaxes, and Pluronics.

The formulas of the invention are sufficiently stable to allow storage and shipment to the end user from a manufacturer or formulator. In certain instances mild agitation may be needed to reform the slurry if any settling occurs. The user, upon receipt of the slurries, would dilute the formulas to use concentrations. Typical use formulations would contain 10–15% by weight of the abrasive particles.

A typical formula of the invention is set forth below:

| Ingredients | grams |
|---|---|
| Alumina | 600 |
| Belclene 283 | 4.8 |
| Acrysol 60 | 4.8 |
| Grotan (biocide) | 1.9 |
| Tripotassium phosphate | 12.0 |
| Carbopol 940 | 3.0 |
| Water | 573.5 |

The above formula was tested in a diluted state to determine its efficacy as a lapping material. Testing was done on silicone wafers. The control was a commercial product typical of that made up by the manufacture of the wafer. These results are set forth below:

| Slurry Used | Lapping Results | | |
|---|---|---|---|
| | Calculated % $Al_2O_3$ | Lapping Time (min.) | Lapping Rate (mils/min.) |
| Control | 10.0 | 10 | 0.25 |
| Test slurry | 9.1 | 7.5 | 0.33 |
| Test slurry | 9.8 | 6.7 | 0.40 |

Having thus described my invention, I claim:

1. A concentrated lapping composition having the following makeup:

| Ingredient | % by weight |
|---|---|
| Finely divided inorganic abrasive | 5–70 |
| Biocide | .05–3 |
| Carboxylic acid dispersant polymer having a molecular weight of from 500–50,000 | .1–1 |
| Cross-linked carboxylic acid gel polymer thickener | 0.5–5 |
| Water-soluble corrosion inhibitor | .5–5 |
| Lubricant (optional) | .5–3 |

2. A concentrated lapping composition having the following makeup:

| Ingredient | % by weight |
|---|---|
| Finely divided inorganic abrasive | 40–60 |
| Biocide | .1–2 |
| Carboxylic acid dispersant polymer having a molecular weight of from 1,000–20,000 | .2–.5 |
| Cross-linked carboxylic acid gel polymer thickener | .2–1.5 |
| Water-soluble corrosion inhibitor | 1–3 |
| Lubricant (optional) | 1–2 |

3. A method of lapping a silicon surface with the composition of claim 1 which has been diluted with water to about 10% abrasive solids.

4. The method of claim 3 where the surface is silicon and the abrasive is alumina.

* * * * *